(12) United States Patent
Sekiyama

(10) Patent No.: US 11,537,149 B2
(45) Date of Patent: Dec. 27, 2022

(54) ROUTE GENERATION DEVICE, MOVING BODY, AND PROGRAM

(71) Applicants: MICWARE CO., LTD., Kobe (JP); iMics. inc., Tokyo (JP)

(72) Inventor: Hiroaki Sekiyama, Kobe (JP)

(73) Assignees: MICWARE CO., LTD., Kobe (JP); IMICS. INC., Tokyo (JP)

( * ) Notice: Subject to any disclaimer, the term of this patent is extended or adjusted under 35 U.S.C. 154(b) by 234 days.

(21) Appl. No.: 16/652,786

(22) PCT Filed: Sep. 28, 2018

(86) PCT No.: PCT/JP2018/036456
§ 371 (c)(1),
(2) Date: Apr. 1, 2020

(87) PCT Pub. No.: WO2019/069829
PCT Pub. Date: Apr. 11, 2019

(65) Prior Publication Data
US 2020/0241573 A1    Jul. 30, 2020

(30) Foreign Application Priority Data
Oct. 3, 2017   (JP) .............................. JP2017-193587

(51) Int. Cl.
G05D 1/10        (2006.01)
B64C 39/02       (2006.01)
G08G 5/00        (2006.01)

(52) U.S. Cl.
CPC ........... *G05D 1/106* (2019.05); *B64C 39/024* (2013.01); *G08G 5/0034* (2013.01); *G08G 5/0069* (2013.01)

(58) Field of Classification Search
CPC .................................................... G05D 1/106
See application file for complete search history.

(56) References Cited

U.S. PATENT DOCUMENTS 8,849,494 B1 *   9/2014   Herbach ........... B60W 60/0015
                                              701/24
9,836,895 B1 *   12/2017  Nygaard .............. G05D 1/0088
(Continued)

FOREIGN PATENT DOCUMENTS

EP      2 806 324 A1    11/2014
JP      2013-145497 A    7/2013
(Continued)

OTHER PUBLICATIONS

Japanese Office Action for Japanese Application No. 2017-193587, dated May 26, 2020.
(Continued)

*Primary Examiner* — Jean Paul Cass
(74) *Attorney, Agent, or Firm* — Birch Stewart, Kolasch & Birch, LLP

(57) ABSTRACT

A route generation device includes: an acquisition portion configured to acquire object data; and a controller configured to set a travel route of a moving body. The controller is configured to define a virtual space corresponding to a predetermined real space including a moving range for the moving body, manage a plurality of regions that the virtual space is divided into, the plurality of divided regions each having a predetermined three-dimensional shape, place the object in the virtual space, set a region that overlaps the object among the plurality of divided regions as a no-go zone where the moving body is not allowed to pass, and set a region that does not overlap the object among the plurality of divided regions as an available zone where the moving body is allowed to move.

8 Claims, 14 Drawing Sheets

(56) References Cited

U.S. PATENT DOCUMENTS

| | | | |
|---|---|---|---|
| 9,880,551 B2* | 1/2018 | Lacaze | G05D 1/0016 |
| 10,551,834 B2* | 2/2020 | Lee | B64C 39/024 |
| 11,048,256 B2* | 6/2021 | Dyer | G08G 1/16 |
| 11,062,537 B2* | 7/2021 | Andrade | G05D 1/0088 |
| 11,073,838 B2* | 7/2021 | Wengreen | G05D 1/0291 |
| 11,106,893 B1* | 8/2021 | Zhu | G06Q 30/0207 |
| 2015/0367848 A1 | 12/2015 | Terashima | |
| 2016/0259330 A1* | 9/2016 | Lacaze | G05D 1/0038 |
| 2017/0116487 A1 | 4/2017 | Yamazaki et al. | |
| 2018/0096611 A1* | 4/2018 | Kikuchi | G08G 5/045 |
| 2018/0164802 A1* | 6/2018 | Lacaze | G06T 3/20 |
| 2018/0170374 A1 | 6/2018 | Otsuka et al. | |
| 2020/0372815 A1* | 11/2020 | Kikuchi | B64D 45/04 |
| 2021/0158705 A1* | 5/2021 | Fairfield | G08G 1/096725 |
| 2021/0278837 A1* | 9/2021 | Fairfield | B60W 30/00 |

FOREIGN PATENT DOCUMENTS

| | | |
|---|---|---|
| JP | 2014-142828 A | 8/2014 |
| JP | 2015-72650 A | 4/2015 |
| JP | 2015-145793 A | 8/2015 |
| JP | 2016-6568 A | 1/2016 |
| JP | 2017-47694 A | 3/2017 |
| JP | 2017-78575 A | 4/2017 |
| JP | 2017-83919 A | 5/2017 |

OTHER PUBLICATIONS

International Search Report issued in PCT/JP2018/036456 (PCT/ISA/210), dated Dec. 25, 2018.

Japanese Office Action for Japanese Application No. 2017-193587, dated Jan. 12, 2021, with machine translation.

* cited by examiner

FIG. 12

| MOVING BODY | START TIME | TRAVEL ROUTE |
|---|---|---|
| A | 9:00 | M1→M2→M3→M4→M5→M6→M7→M8→M9→M10 |
| B | 8:20 | M7→M6→M5→M4→M3→M2→M1 |
| C | 9:00 | M3→M4→M5→M14→M13→M12→M7→M8 |
| D | 9:30 | M6→M7→M8→M12→M13→M14→M18→M19 |

ROUTE GENERATION DEVICE, MOVING BODY, AND PROGRAM

TECHNICAL FIELD

The present invention relates to a route generation device, a moving body, and a program for generating a travel route of a moving body.

BACKGROUND ART

Patent Document 1 discloses an obstacle map generation device that generates a map of a three-dimensional space in which the presence or absence of an obstacle is represented by a grid-like voxel. The obstacle map generation device of Patent Document 1 calculates positions of obstacles around a flying object based on outputs of a stereo camera and a distance data sensor provided in the flying object. This obstacle map generation device increases the resolution of an attention range by representing the attention range that is a part of the map with smaller voxels based on a movement vector of the flying object.

Patent Document 2 discloses an inspection system that inspects an inspection object using a drone equipped with a camera. The inspection system of Patent Document 2 includes a server device, a station terminal, and a drone. The server device transmits course information of the drone to the station terminal. The station terminal generates course control information and imaging control information based on the course information. The drone performs capturing the image based on the imaging control information while automatically navigating based on the course control information. The inspection system of Patent Document 2 enables inspection of defects of an inspection object by capturing the image of the inspection object by remotely operating a drone.

PRIOR ART DOCUMENTS

Patent Documents

Patent Document 1: JP 2017-83919 A
Patent Document 2: JP 2017-78575 A

SUMMARY OF THE INVENTION

Problems to be Solved by the Invention

Conventionally, a travel route of a moving body is generated based on a camera image or a 3D modeling image. Therefore, the calculation for generating the travel route is complicated and a calculation amount is large.

An object of the present invention is to provide a route generation device capable of generating a travel route of a moving body relatively easily, a moving body moving along the travel route, and a program.

Means for Solving the Problems

A route generation device according to the present invention generates a travel route of a moving body. The route control device includes an acquisition portion and a controller. The acquisition portion is configured to acquire object data indicating a shape of an object. The controller is configured to set the travel route of the moving body based on the object data. The controller is configured to define a virtual space corresponding to a predetermined real space including a moving range for the moving body. The controller is configured to manage a plurality of divided regions that the virtual space is divided into, the plurality of divided regions each having a predetermined three-dimensional shape. The controller is configured to place the object in the virtual space. The controller is configured to set a region that overlaps the object among the plurality of divided regions as a no-go zone where the moving body is not allowed to pass. The controller is configured to set a region that does not overlap the object among the plurality of divided regions as an available zone where the moving body is allowed to move.

The moving body according to the present invention moves along the travel route. The moving body includes a position detector, a driver, and a controller. The position detector is configured to detect a current location of the moving body. The driver is configured to move the moving body. The controller is configured to control the driver based on the current location and the travel route. A virtual space defined corresponding to a predetermined real space including the moving range of the moving body is divided into a plurality of regions each having a predetermined three-dimensional shape. Each of the plurality of divided regions is set as a no-go zone where the moving body is not allowed to pass or as an available zone where the moving body is allowed to pass. A travel route is set by specifying the divided regions in the available zone.

A program according to the present invention is a program for generating a travel route of a moving body, the program causing a computer to execute: defining a virtual space corresponding to a predetermined real space including a moving range for the moving body; managing a plurality of regions that the virtual space is divided into, the plurality of regions each having a predetermined three-dimensional shape; placing an object in the virtual space; setting a region that overlaps the object among the plurality of divided regions as a no-go zone; setting a region that does not overlap the object among the plurality of divided regions as an available zone; and setting a travel route by specifying the divided regions in the available zone.

Effects of the Invention

According to the route generation device, the moving body, and the program according to the present invention, a virtual space is defined corresponding to a real space including the moving range of the moving body, and the virtual space is managed by being divided into a plurality of regions each having a predetermined three-dimensional shape. Thereby, the route generation device can generate a travel route relatively easily. The moving body can move along the travel route with a relatively small amount of calculation.

BRIEF DESCRIPTION OF THE DRAWINGS

FIG. 12 is a diagram for explaining route information in the second embodiment.

MODES FOR CARRYING OUT THE INVENTION

First Embodiment

Figure 1:
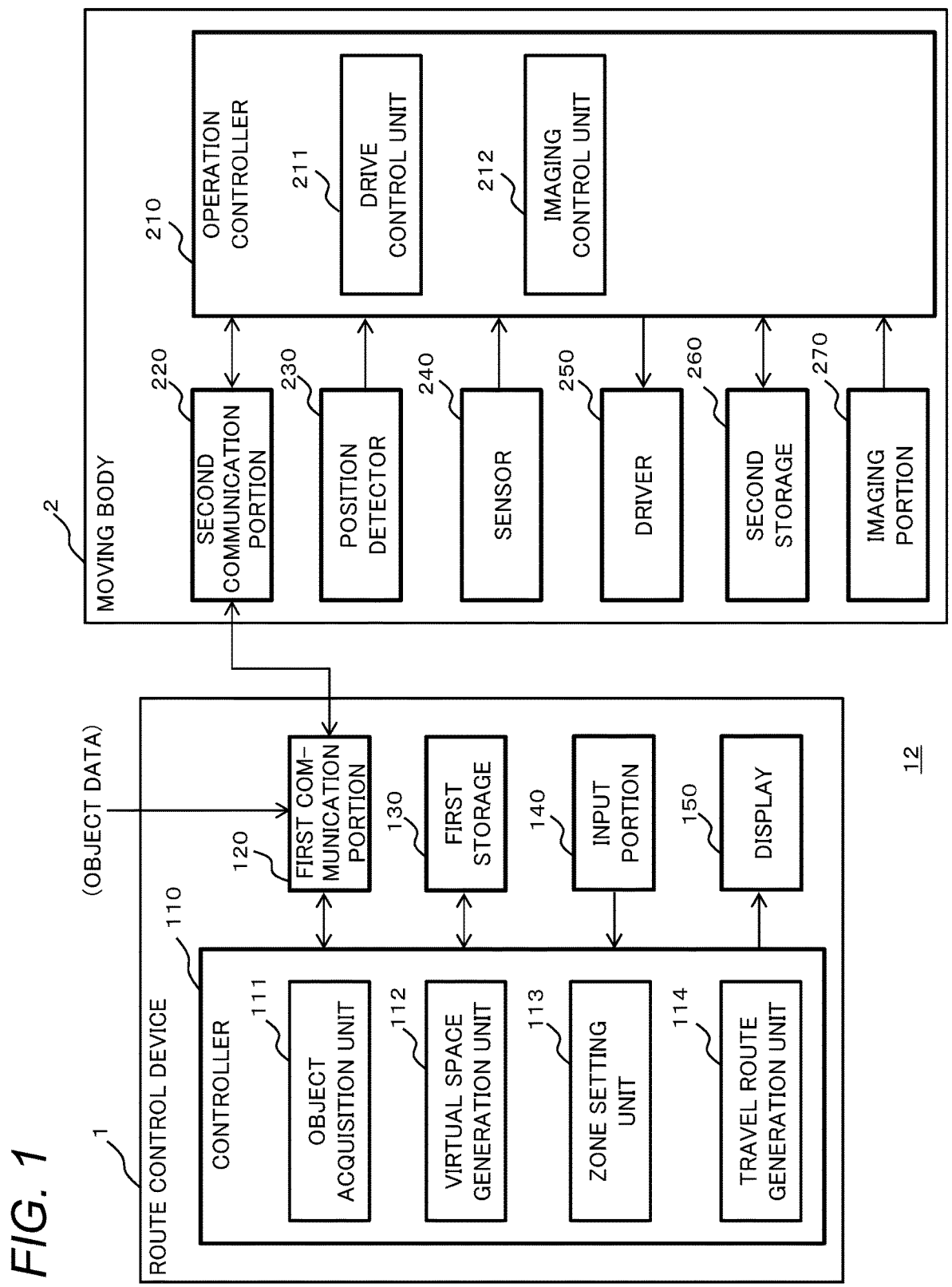
FIG. 1 is a diagram illustrating a configuration of a route control device and a moving body according to a first embodiment.

With reference to FIG. 1, the configuration of a route control device 1 and a moving body 2 will be described. The route control device 1 is a device that generates a travel route of the moving body 2. That is, the route control device 1 is an example of a route generation device in the present embodiment. The route control device 1 is various information processing devices such as a personal computer, a smartphone, and a tablet terminal. The moving body 2 is configured to be able to move autonomously. In the present embodiment, the moving body 2 is an unmanned aircraft such as a drone that autonomously flies.

The route control device 1 and the moving body 2 of the present embodiment constitute an imaging system 12 that captures an image of an inspection object. The imaging system 12 is used to inspect an inspection object such as an aircraft, for example. The user uses the route control device 1 to control the travel route of the moving body 2 on which the camera is mounted, and acquires the image of the inspection object. The user can inspect the appearance of the inspection object using the acquired image.

Hereinafter, the configurations of the route control device 1 and the moving body 2 in the present embodiment will be described.

(Route Control Device)

The route control device 1 includes a controller 110, a first communication portion 120, a first storage 130, an input portion 140, and a display 150.

The controller 110 controls the operation of the route control device 1. The controller 110 includes an object acquisition unit 111, a virtual space generation unit 112, an zone setting unit 113, and a travel route generation unit 114 as functional configurations. The object acquisition unit 111 acquires object data indicating the shape of the object from the first communication portion 120, the first storage 130, or the like. The virtual space generation unit 112 defines a virtual space corresponding to a real space including the moving range of the moving body 2, and manages the virtual space by dividing it into a plurality of regions each having a predetermined three-dimensional shape. The zone setting unit 113 divides the virtual space into a no-go zone where the moving body 2 cannot pass and an available zone where the moving body 2 can pass. The travel route generation unit 114 sets a travel route of the moving body 2 within the available zone, and generates route information indicating the set travel route.

The controller 110 includes, for example, a CPU (Central Processing Unit) or an MPU (Micro Processing Unit) that realizes a predetermined function in cooperation with software. The controller 110 realizes a predetermined function by reading out data and programs stored in the first storage 130 and performing various arithmetic processes. The controller 110 may have various functions such as a clocking function. The program executed by the controller 110 may be provided from the first communication portion 120 or the like, or may be stored in a portable recording medium.

The controller 110 may be configured by a hardware circuit such as a dedicated electronic circuit designed to realize a predetermined function or a reconfigurable electronic circuit. The controller 110 may be configured with various semiconductor integrated circuits. Examples of various semiconductor integrated circuits include a CPU, MPU, microcomputer, DSP (Digital Signal Processor), FPGA (Field Programmable Gate Array), and ASIC (Application Specific Integrated Circuit).

The first communication portion 120 includes a module for communicatively connecting the route control device 1 to an external device such as the moving body 2 via a wireless communication channel. The first communication portion 120 may further include a module for communication connection via a wired communication line. The first communication portion 120 is an example of a communication device that performs communication according to a predetermined communication standard. The predetermined communication standards include communication standards such as IEEE (Institute of Electrical and Electronic Engineers) 802.3, IEEE802.11a/11b/11g/11ac, USB (Universal Serial Bus), HDMI (registered trademark) (High-Definition Multimedia Interface), IEEE1395, Wi-Fi (registered trademark), and Bluetooth (registered trademark). The first communication portion 120 is an example of an acquisition unit in the present embodiment.

The first storage 130 is a storage medium that stores programs and data necessary for realizing the functions of the route control device 1. The first storage 130 includes, for example, an HDD (Hard Disk Drive) or an SSD (Solid State Drive). The first storage 130 may include, for example, a flash memory, a DRAM (Dynamic Random Access Memory), or an SRAM (Static Random Access Memory). The first storage 130 may temporarily store various pieces of information. The first storage 130 may be configured to function as a work area for the controller 110, for example.

The input portion 140 is an HMI (Human Machine Interface) for inputting various operations by the user. The input portion 140 is, for example, a 3D mouse. The input portion 140 may be a touch panel configured with the display 150. Further, the input portion 140 may be a keyboard, a button, a switch, and a combination thereof.

The display 150 is configured by, for example, a liquid crystal display or an organic EL (Electro Luminescence) display.

(Moving Body)

The moving body 2 includes an operation controller 210, a second communication portion 220, a position detector 230, a sensor 240, a driver 250, a second storage 260, and an imaging portion 270.

The operation controller 210 controls the operation of the moving body 2. The operation controller 210 includes a drive control unit 211 and an imaging control unit 212 as functional configurations. The drive control unit 211 controls the driver 250 based on the route information indicating the travel route and the current location of the moving body 2. The imaging control unit 212 controls the imaging portion 270 so as to capture an image of the inspection object in the travel route of the moving body 2.

The operation controller 210 includes, for example, a CPU or an MPU that realizes a predetermined function in cooperation with software. The operation controller 210 reads out data and programs stored in the second storage 260, performs various arithmetic processes, and realizes a predetermined function. The operation controller 210 may have various functions such as a clocking function. The program executed by the operation controller 210 may be provided via the second communication portion 220, or may be stored in a portable recording medium.

The operation controller 210 may be configured by a hardware circuit such as a dedicated electronic circuit designed to realize a predetermined function or a reconfigurable electronic circuit. The operation controller 210 may be composed of various semiconductor integrated circuits. Examples of various semiconductor integrated circuits include a CPU, MPU, microcomputer, DSP, FPGA, and ASIC.

The second communication portion 220 is a module for communicatively connecting the moving body 2 to an external device such as the route control device 1 via a communication network in a mobile communication system. The second communication portion 220 is not limited to a case of communicating with the route control device 1, and is configured to be able to communicate with an external device. The second communication portion 220 is configured to be able to perform communication according to a predetermined communication standard. The predetermined communication standards include communication standards such as, IEEE802.3, IEEE802.11a/11b/11g/11ac, IEEE1395, Wi-Fi (registered trademark), and Bluetooth (registered trademark). The second communication portion 220 is an example of an acquisition portion in the present embodiment.

The position detector 230 detects a position indicating the current location in the geographic coordinate system. The position detector 230 is, for example, a GPS (Global Positioning System) module that receives radio waves from a GPS satellite and measures the latitude and longitude of the received point. The position detector 230 may be configured to measure altitude in addition to the latitude and longitude of the received point.

The sensor 240 is configured to include, for example, an acceleration sensor that detects acceleration and a gyro sensor that detects angular velocity. The moving body 2 can more accurately detect the three-dimensional position of the moving body 2 by referring to the output of the sensor 240 in addition to the position detector 230.

The driver 250 is a drive device that moves the moving body 2. The driver 250 includes, for example, a rotary blade and a motor. The driver 250 causes the moving body 2 to move forward, march, turn, and hover.

The second storage 260 is a storage medium that stores programs and data necessary for realizing the functions of the moving body 2. The second storage 260 is configured to include, for example, an HDD or an SSD. Further, the second storage 260 may be configured to include, for example, a flash memory, a DRAM, or an SRAM. The second storage 260 may temporarily store various pieces of information. The second storage 260 may be configured to function as a work area for the operation controller 210, for example.

The imaging portion 270 is, for example, a camera including an imager, such as a CCD (Charge-Coupled Device) image sensor or a CMOS (Complementary Metal Oxide Semiconductor) image sensor. The imaging portion 270 may be an infrared camera. Image data generated by the imaging portion 270 by capturing the image of the inspection object are transmitted to the route control device 1 or another external device via the second communication portion 220, for example. The image data may be stored in the second storage 260 of the moving body 2.

(Overall Operation of the Route Control Device and Moving Body)

Figure 2:
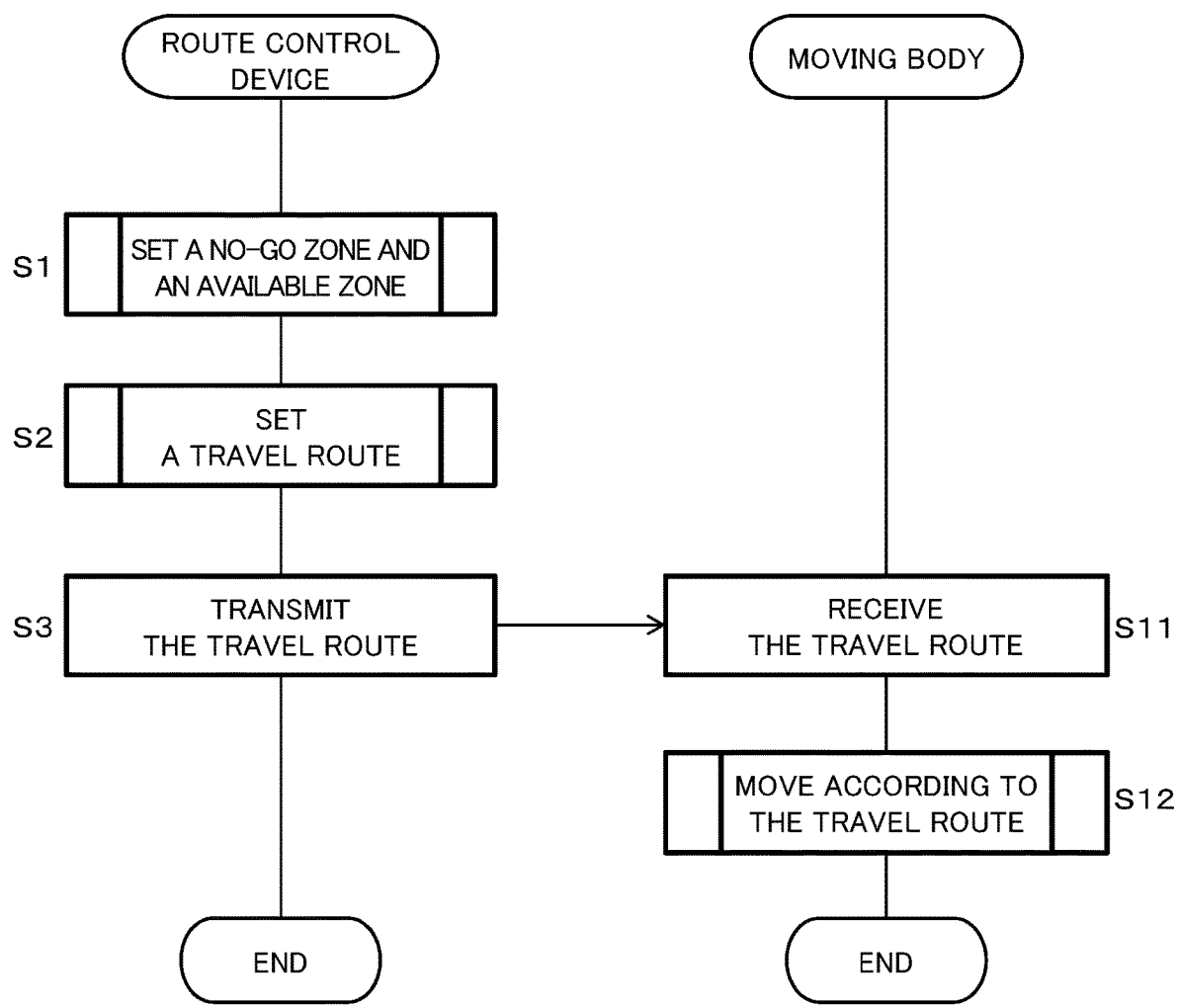
FIG. 2 is a sequence diagram for explaining the overall operation of the route control device and the moving body in the first embodiment.

With reference to FIG. 2, the overall operation of the route control device 1 and the moving body 2 will be described. In this Description, as shown in FIG. 2, the step is denoted as "S". The process shown in FIG. 2 is started, for example, when the user starts an application program for setting a travel route via the input portion 140 of the route control device 1.

The controller 110 of the route control device first sets a no-go zone and an available zone in the virtual space (S1). Then, the controller 110 sets the travel route of the moving body 2 within the available zone (S2). The controller 110 transmits route information indicating the set travel route to the moving body 2 via the first communication portion 120 (S3). The moving body receives the route information indicating the travel route from the route control device 1 via the second communication portion 220 (S11). The operation controller 210 of the moving body 2 drives the driver 250 to move according to the travel route (S12).

(Setting Process of a No-Go Zone and an Available Zone)

Figure 3:
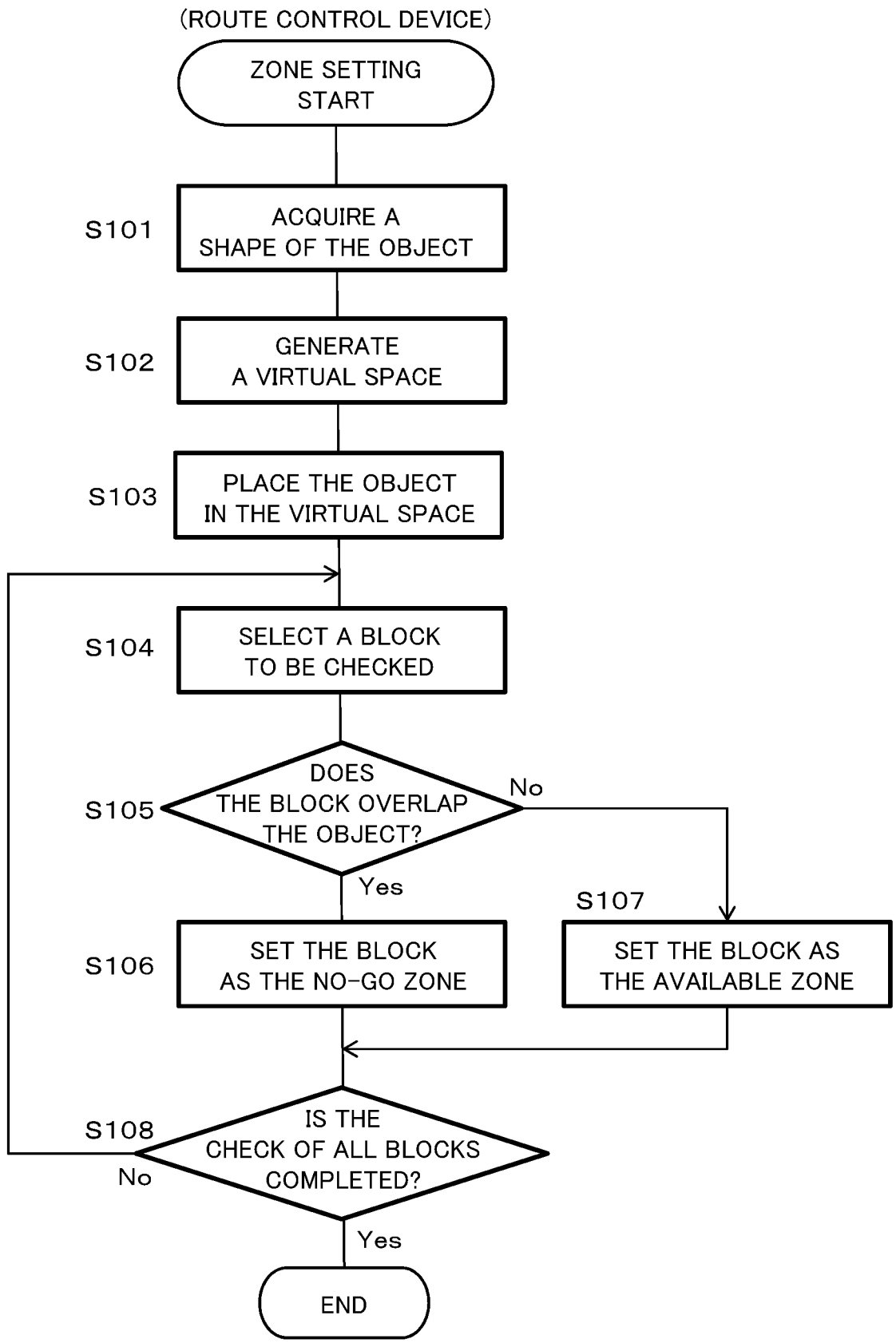
FIG. 3 is a flowchart for explaining a setting process of a no-go zone and an available zone in the first embodiment.
Figure 4:
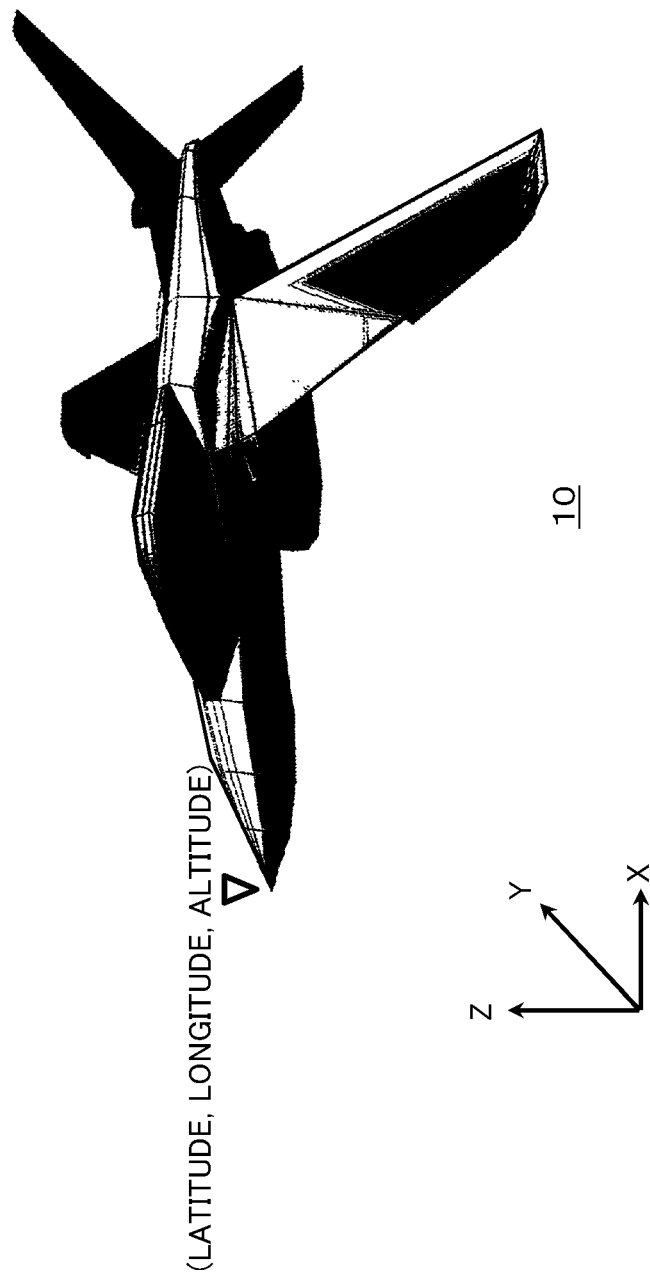
FIG. 4 is a diagram showing an example of an object.
Figure 5:
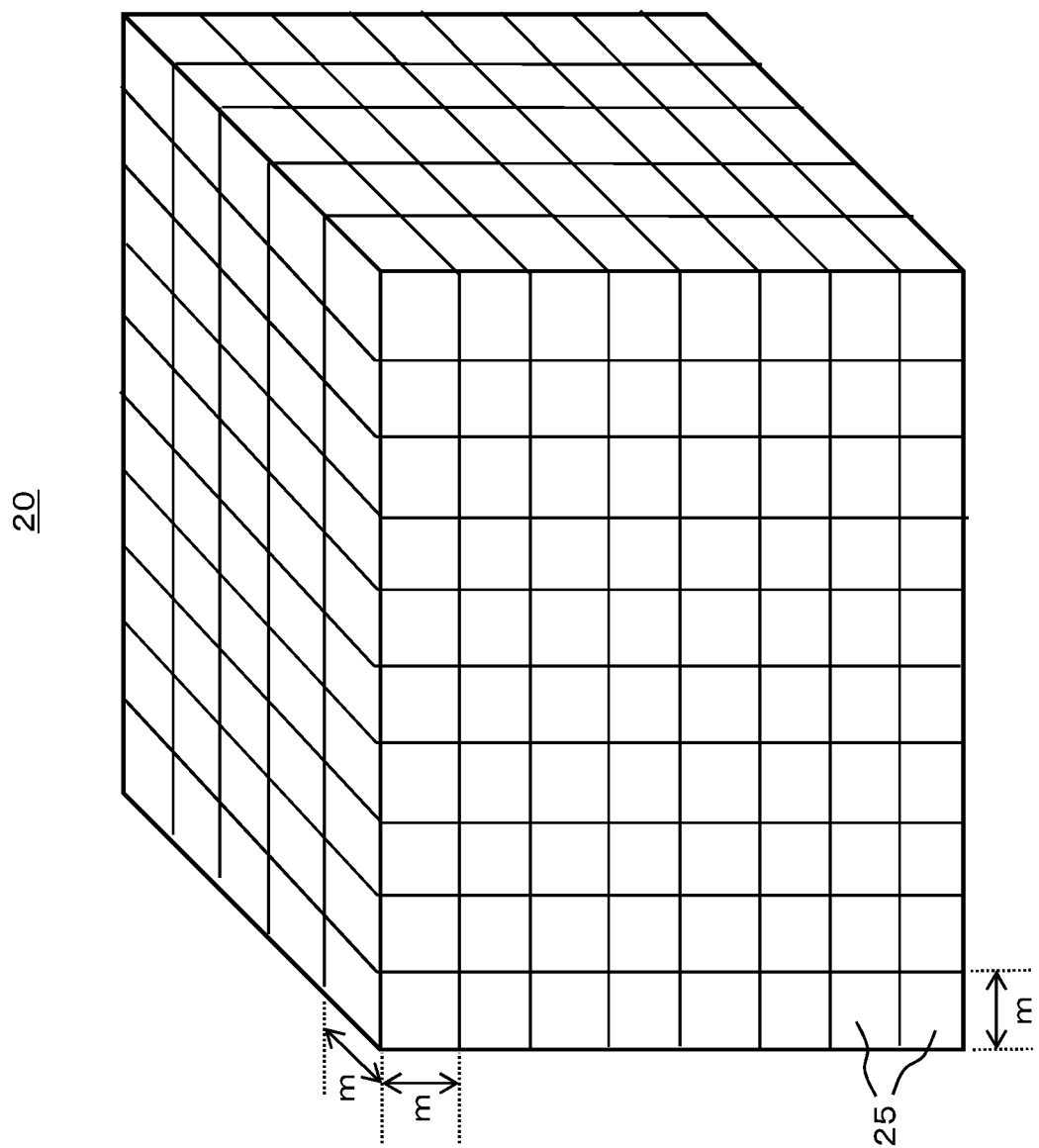
FIG. 5 is a diagram schematically showing a virtual space.
Figure 6:
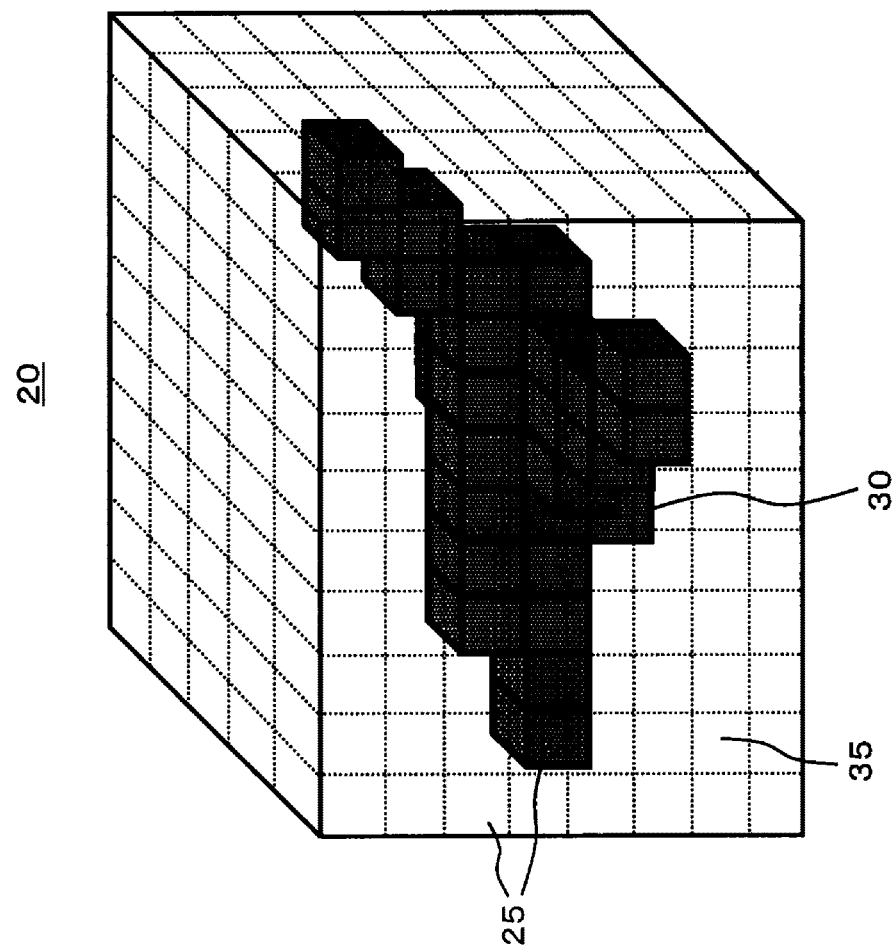
FIG. 6 is a diagram for explaining no-go zones and available zones.

With reference to FIG. 3 to FIG. 6, the setting process of the no-go zone and the available zone will be described. FIG. 3 shows details of the setting process (S1) of the no-go zone and the available zone. FIG. 4 shows an example of an object. FIG. 5 schematically shows a virtual space. FIG. 6 schematically shows the set no-go zone and available zone.

The controller 110 of the route control device performs the process shown in FIG. 3. The object acquisition unit 111 acquires object data indicating the shape of an object 10 as shown in FIG. 4 (S101). FIG. 4 illustrates an aircraft as the object 10. The object acquisition unit 111 may acquire object data via the first communication portion 120. The object acquisition unit 111 may acquire object data stored in the first storage 130. The object data is, for example, CAD (Computer Aided Design) data. The shape of the object 10 is formed of any one of a wire frame model, a surface model, and a solid model. For example, when the user intends to inspect an antenna provided on an outer wall of the aircraft for damage, the user selects CAD data of the aircraft via the input portion 140. The object data may further include information indicating the position of the object 10 in the actual geographic coordinate system. The position of the geographic coordinate system includes, for example, latitude, longitude, and altitude.

The virtual space generation unit 112 generates a virtual space 20 as shown in FIG. 5 (S102). Specifically, the virtual space generation unit 112 defines the virtual space 20 in association with a predetermined real space including the moving range of the moving body 2. For example, the virtual space generation unit 112 preferably defines the virtual space 20 in a size larger than the object 10 based on the object data. For example, the virtual space generation unit 112 can define a virtual space 20 that is K times as large as the object 10 (K>1). The virtual space generation unit 112 manages the defined virtual space 20 by dividing it into a plurality of cubic blocks 25. The virtual space generation unit 112 sets the size (m×m×m) of the block 25 to be equal to or larger than the size of the moving body 2.

The zone setting unit 113 virtually places the object 10 in association with the virtual space 20 (S103). Specifically, the zone setting unit 113 associates the coordinate system of the object 10 with the coordinate system of the virtual space 20.

The zone setting unit 113 selects one block 25 to be checked (S104). The zone setting unit 113 determines whether or not the selected block 25 overlaps the object 10 (S105). If the block 25 overlaps the object 10 (Yes in S105), the zone setting unit 113 sets the block 25 as a no-go zone (S106). For example, in the case that the object and the block 25 partially overlap, the zone setting unit 113 sets the block 25 as a no-go zone. If the block 25 does not overlap the object 10 (No in S105), the zone setting unit 113 sets the block 25 as an available zone (S107).

The zone setting unit 113 determines whether or not the check of the overlap with the object 10 is completed for all the blocks 25 forming the virtual space (S108). If there is still a block 25 that is not checked for overlap with the object 10 (No in S108), the process returns to step S104. The zone setting unit 113 selects the block 25 that is not checked and checks the overlap with the object 10. When all the blocks 25 forming the virtual space 20 are checked for overlap with the object 10 (Yes in S108), the zone setting process ends.

By performing the zone setting process shown in FIG. 3, the blocks 25 forming the virtual space 20 are divided into a no-go zone 30 and an available zone 35 as shown in FIG. 6. The available zone 35 is blocks 25 excluding the no-go zone 30 in the virtual space 20.

(Travel Route Setting Process)

Figure 7:
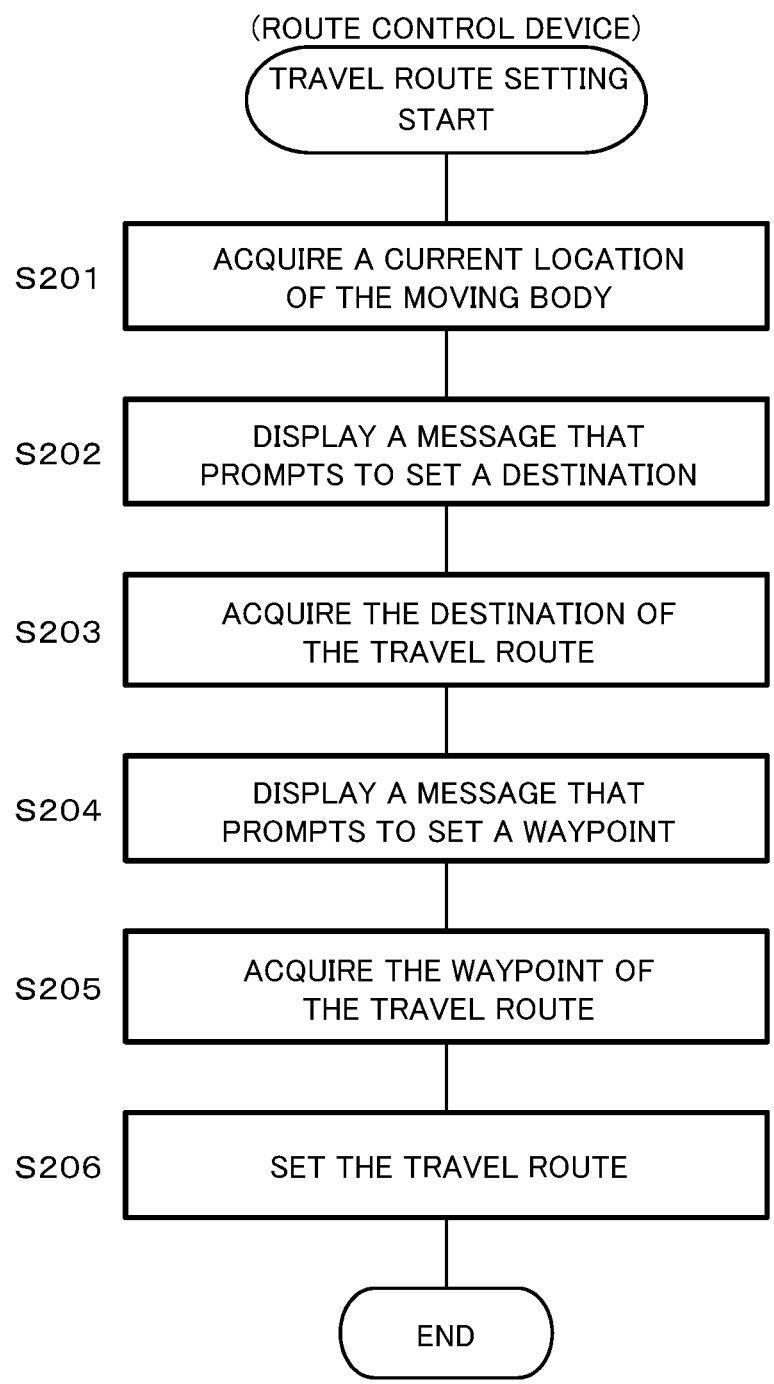
FIG. 7 is a flowchart for explaining a travel route setting process in the first embodiment.
Figure 8:
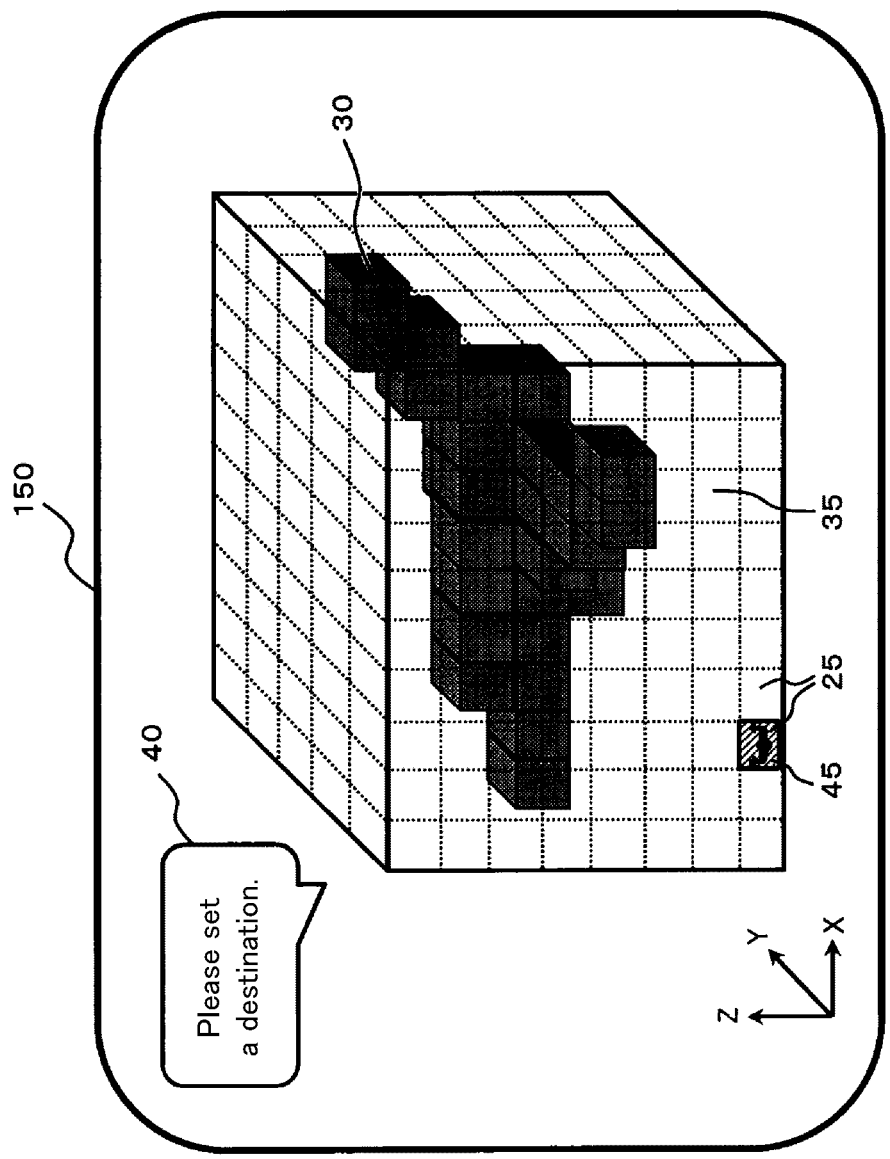
FIG. 8 is a diagram showing an example of a screen for prompting to set destination.
Figure 9:
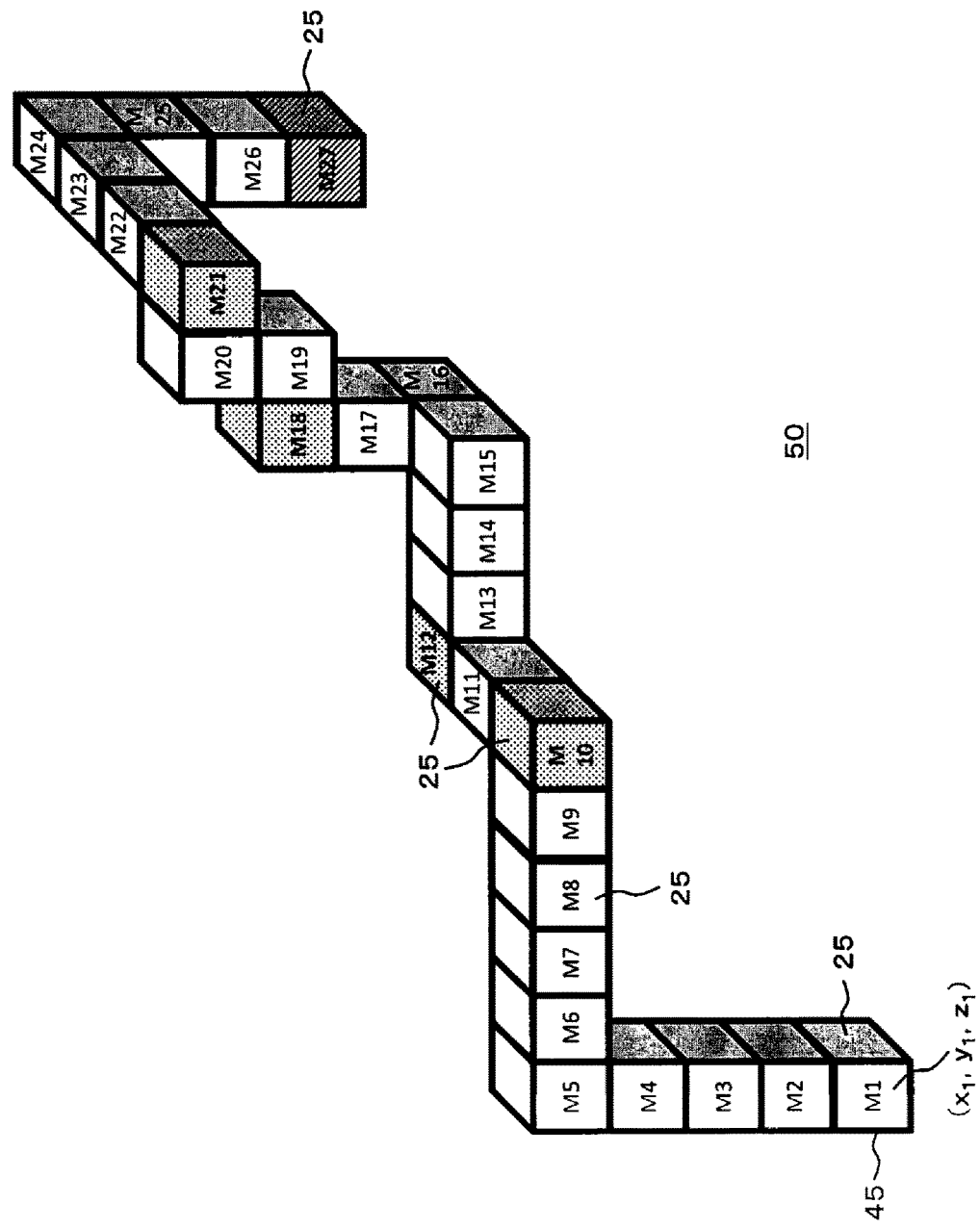
FIG. 9 is a diagram schematically showing a set travel route.

With reference to FIGS. 7 to 9, the travel route setting process will be described. FIG. 7 shows details of the travel route setting process (S2). FIG. 8 shows a display example of a screen for prompting to set the destination. FIG. 9 schematically shows an example of the set travel route. In the example of FIG. 9, the travel route 50 includes blocks 25 having block numbers M1 to M27.

The controller 110 of the route control device 1 performs the process shown in FIG. 7. The travel route generation unit 114 acquires the current location of the moving body 2 from the moving body 2 (S201). The current location of the moving body 2 is a position in the geographic coordinate system, and specifically includes latitude, longitude, and altitude. The travel route generation unit 114 may acquire the current location of the moving body 2 input by the input portion 140. The travel route generation unit 114 associates the position of the moving body 2 in the geographic coordinate system with the position of the coordinate system in the virtual space 20, and sets the current location of the moving body 2 as a start point of the travel route in the virtual space 20. In the example of FIG. 9, the position of the moving body 2 in the geographic coordinate system is associated with a position (x1, y1, z1) of the coordinate system of the virtual space 20. The block 25 of the block number M1 in the position (x1, y1, z1) of the coordinate system of the virtual space 20 is set as a start point 45.

As shown in FIG. 8, the travel route generation unit 114 displays a message 40 that prompts to set the destination on the display 150 (S202). At this step, the travel route generation unit 114 is configured to display the no-go zone 30 and the available zone 35 on the display 150 in a visually distinguishable manner with each other. In order to visually distinguish the no-go zone 30 and the available zone 35, for example, they may be color-coded and displayed on the display 150. The travel route generation unit 114 may display the block 25 as the start point 45 of the travel route on the display 150 in the visually distinguishable manner from the blocks 25 other than the start point 45. Note that it is preferable to display the block 25 such that the transparency of the block 25 closer to the front in the screen is higher in the display 150 so that the block 25 on the backward in the screen can be easily seen. Furthermore, the object 10 and the virtual space 20 may be displayed in an overlapping manner on the screen of the display 150.

The user can specify a destination by selecting any block 25 in the available zone 35 via the input portion 140. At this time, the travel route generation unit 114 may set the block 25 in the no-go zone 30 so that the user cannot select the block 25. When the user selects the block 25, the travel route generation unit 114 may display the block 25 selected by the user on the display 150 in the visually distinguishable manner from the blocks 25 not selected by the user. For example, the travel route generation unit 114 may change the transparency or coloring of the block 25 and cause the display 150 to display the selected block 25 so as to be emphasized. When the user selects the block 25, a corresponding portion of the object which corresponds to the selected block 25 may be displayed. When the user selects any block 25 as the destination, the travel route generation unit 114 may calculate the shortest route in the available zone 35 from the start point 45 of the travel route to the block 25 selected by the user, and may display it on the display 150 as a temporary travel route.

The travel route generation unit 114 acquires information indicating a block 25 determined as the destination by the user (S203), to set the block 25 as the destination of the travel route. In the travel route 50 shown in FIG. 9, the block 25 with the block number M27 is set as the destination.

The travel route generation unit 114 displays a message that prompts the waypoint setting on the display 150 (S204). The message that prompts the waypoint setting may be displayed, for example, in the same manner as the message 40 as shown in FIG. 8. The travel route generation unit 114 acquires information indicating the block 25 determined as the waypoint by the user (S205), to set the block 25 as the waypoint of the travel route. In the travel route 50 shown in FIG. 9, blocks 25 with block numbers M10, M12, M18, and M21 indicated by hatching are set as waypoints.

The travel route generation unit 114 calculates the shortest distance in the available zone 35 from the start point 45 of the travel route to the destination through the waypoint, and sets the calculated shortest route as the travel route (S206). In the case that a plurality of waypoints are set, the travel route generation unit 114 may set the travel route so as to pass through the waypoints in the order selected by the user. Note that it is not always necessary to specify the waypoint. If no waypoint is set, the shortest route in the available zone from the start point 45 of the travel route to the destination may be set as the travel route. Note that the travel route to be set may not be the shortest distance. The travel route may be the simplest route, such as the route with the smallest number of changes in direction.

The end point of the travel route is an arbitrary point. For example, the end point of the travel route may be the same as the start point 45 of the travel route. In this case, the travel route may be set so that the travel route from the start point 45 to the destination is traced back to the start point 45. The travel route 50 set as described above is composed of blocks 25 that are continuously adjacent to each other as shown in FIG. 9.

The travel route generation unit 114 generates route information indicating the set travel route. The route information is information that can identify the blocks 25 constituting the travel route 50. The route information may be represented by a three-dimensional coordinate value (x, y, z) of the center position of the block 25 constituting the travel route 50. The generated route information is transmitted from the route control device 1 to the moving body 2.

(Moving Control Process)

Figure 10:
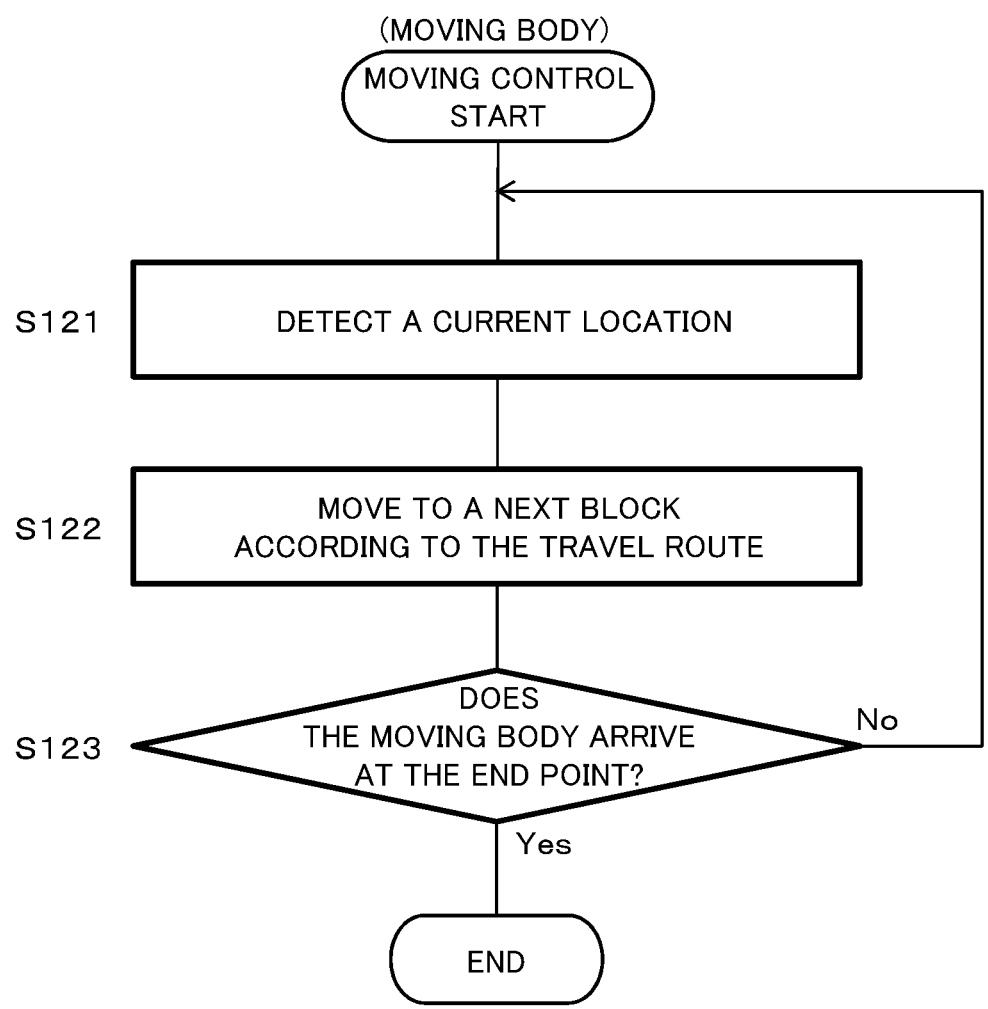
FIG. 10 is a flowchart for explaining a movement control process in the first embodiment.

FIG. 10 shows details of the moving control process (S12) according to the travel route. The operation controller 210 of the moving body 2 performs the process shown in FIG. 10.

In response to receiving the route information indicating the travel route, the drive control unit 211 detects the current location of the moving body 2 from the outputs of the position detector 230 and the sensor 240 (S121). The moving body 2 is located at the start point 45 of the travel route at the start of movement. The drive control unit 211 compares the current location with the travel route, and controls the driver 250 to move to the block 25 next to the start point 45 of the travel route according to the travel route (S122). The drive control unit 211 associates the position of the moving body 2 in the geographic coordinate system with the position of the three-dimensional coordinate system of the travel route, to compare the current location with the travel route. The imaging control unit 212 controls the imaging portion 270 so as to capture the image of the actual object 10 that is the inspection object during movement of the moving body 2. The drive control unit 211 determines whether or not the moving body 2 arrives at the end point of the travel route (S123). If it does not arrive at the end point (No in S123), the process returns to step S121, and it moves to the next block 25 in the travel route while comparing the current location with the travel route. When it arrives at the end point (Yes in S123), the drive control unit 211 ends the control of the driver 250.

(Overview and Effects)

As described above, the route control device 1 is a route generation device that generates a travel route of the moving body 2. The route control device 1 includes a first communication portion 120, which is an example of an acquisition portion that acquires object data indicating the shape of the object 10, and a controller 110 that sets the travel route of the moving body 2 based on the object data. The controller 110 defines the virtual space 20 in association with a predetermined real space including the moving range of the moving body 2. The controller 110 manages the virtual space 20 by dividing the virtual space into blocks 25 which are examples of a plurality of regions each having a predetermined three-dimensional shape. The controller 110 places the object 10 in the virtual space 20. The controller 110 sets the block 25 that overlaps the object 10 among the plurality of blocks 25 as the no-go zone 30 where the moving body 2 is not allowed to pass. The controller 110 sets a region that does not overlap the object 10 among the plurality of blocks 25 as the available zone 35 where the moving body 2 is allowed to move.

In the present embodiment, since the no-go zone and the available zone 35 are divided by placing the object 10 in the virtual space 20, the no-go zone 30 and the available zone 35 can be set relatively easily. In addition, since the virtual space 20 is managed by being divided into a plurality of blocks 25, the travel route of the moving body 2 can be set relatively easily using the plurality of divided blocks 25.

Specifically, the controller 110 sets the travel route 50 by specifying the block 25 in the available zone 35. Therefore, in this embodiment, the travel route 50 can be set relatively easily. Further, the moving body can move according to the travel route 50 with a relatively small amount of calculation using the plurality of divided blocks 25.

The route control device 1 further includes a display 150. The display 150 displays the no-go zone 30 and the available zone 35 in a visually distinguishable manner with each other. Therefore, the user can select the waypoint and destination of the travel route 50 from the blocks 25 in the available zone 35 while looking at the display 150. Thereby, the user can easily set the waypoint and the destination.

The size of the block 25 is set equal to or larger than the size of the moving body 2. Therefore, the moving body 2 can sequentially follow the blocks 25 of the travel route 50 one by one. Therefore, the moving body 2 can easily move along the travel route 50 with a relatively small amount of calculation. The size of the block 25 is set equal to or smaller than the size of the object 10. Therefore, the moving body 2 can easily move around the object 10 according to the travel route 50 with a relatively small amount of calculation.

The block 25 is a cube. Thereby, the route control device 1 can easily set the travel route 50.

The moving body 2 includes a position detector 230, a driver 250, and an operation controller 210. The position detector 230 detects the current location of the moving body 2. The driver 250 moves the moving body 2. The operation controller 210 controls the driver 250 based on the current location and the travel route 50. Since the travel route 50 is set by the block 25, the moving body 2 can move along the travel route 50 with a relatively small amount of calculation. The moving body 2 is a flying object that autonomously flies, and is, for example, a drone. According to the present embodiment, the flight route in the three-dimensional space can be easily set.

Second Embodiment

In the second embodiment, it is assumed that a plurality of moving bodies 2 move in a real space corresponding to the virtual space 20. In the present embodiment, if there is a block 25 that is common to the travel routes of the plurality of moving bodies 2, the travel route is changed so as not to pass through the common block 25 in the same time zone. This avoids collision between the plurality of moving bodies 2.

Figure 11:
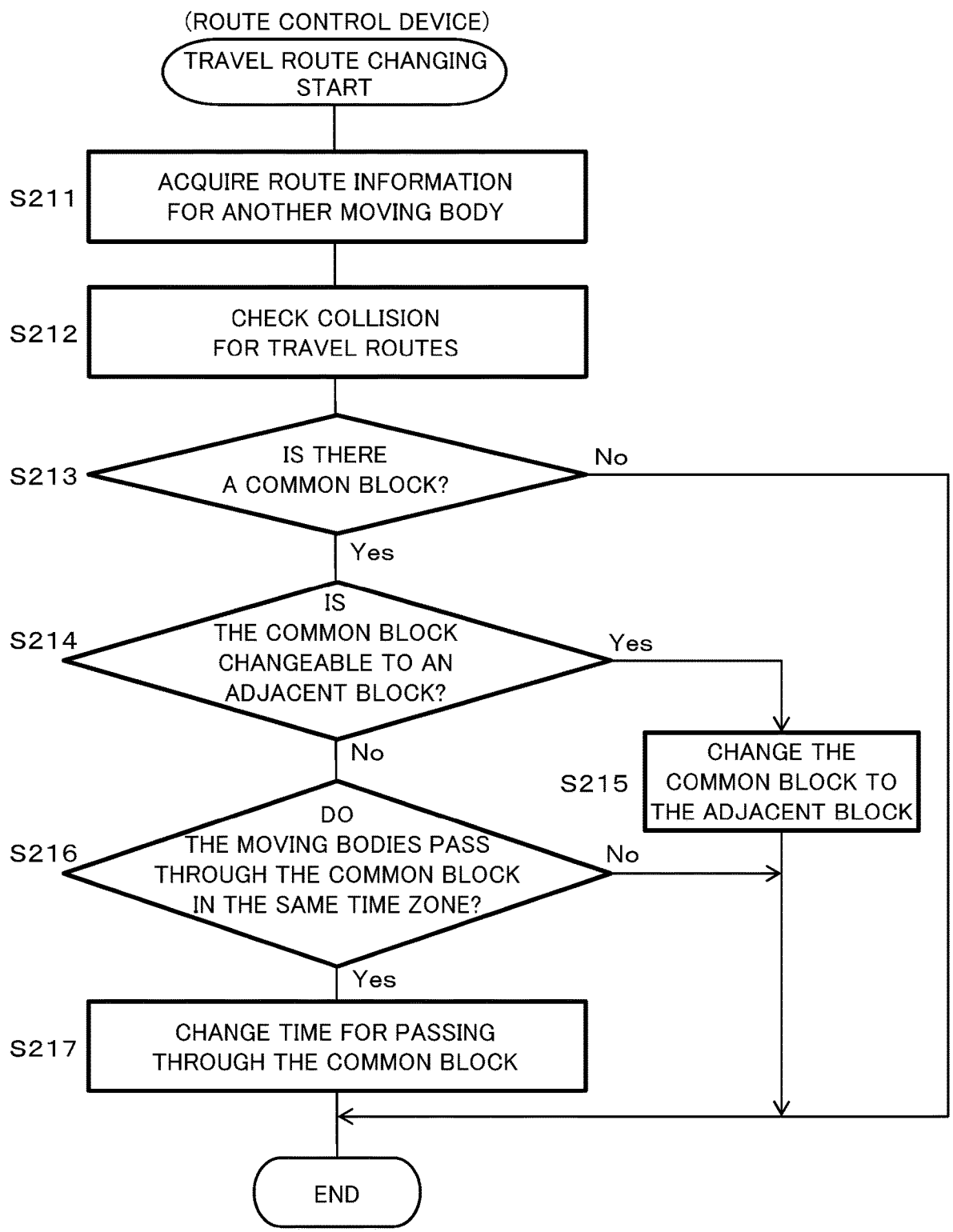
FIG. 11 is a flowchart for explaining a travel route change process in a second embodiment.

With reference to FIG. 11 and FIG. 12, a travel route change process in the second embodiment will be described. FIG. 11 shows the travel route change process in the second embodiment. FIG. 12 shows an example of route information 60 indicating a travel route.

The route control device 1 is an example of a route generation device in the present embodiment. In the present embodiment, an example will be described that in the case where each of a plurality of users owns a pair of the route control device 1 and the moving body 2, the route control device 1 changes the travel route of own moving body 2 so as not to collide with the travel route of another moving body 2. For example, the travel route of a moving body "A" shown in FIG. 12 is changed so that the travel route of the moving body "A" does not collide with the travel routes of the other moving bodies "B", "C", and "D".

In the present embodiment, the controller 110 performs the process shown in FIG. 11. The travel route change process shown in FIG. 11 is performed before the set travel route is transmitted to the moving body 2 (between steps S2 and S3 in FIG. 2).

The travel route generation unit 114 acquires route information indicating the travel route of another moving body 2 from another route control device 1 (S211). The travel route generation unit 114 may acquire route information indicating a travel route of another moving body 2 from another moving body 2.

The route information 60 includes, for example as shown in FIG. 12, identification information 61 for identifying the moving body 2, start time 62 when the moving body 2 starts moving, and information indicating the travel route 50 set by the block 25. In FIG. 12, the travel route 50 is indicated by a block number.

The travel route generation unit 114 determines whether or not the common block 25 is included in the travel route of its own moving body 2 and the acquired travel route of another moving body 2 (S212). Thereby, the travel route generation unit 114 determines whether or not the moving body 2 may collide with another moving body 2. If there is no common block 25 (No in S213), the travel route change process is terminated without changing the travel route of the moving body 2.

If there is a common block 25 (Yes in S213), the travel route generation unit 114 determines whether or not the common block 25 can be changed to the adjacent block 25 (S214). That is, it is determined whether the adjacent block 25 is the block 25 in the no-go zone 30 or the block 25 in the available zone 35. If the adjacent block 25 is the block 25 in the available zone 35 (Yes in S214), the travel route generation unit 114 changes the common block 25 to the adjacent block 25 (S215).

If all of the adjacent blocks 25 are blocks 25 within the no-go zone 30 (No in S214), the travel route generation unit 114 determines whether or not the own moving body 2 and another moving body 2 pass through the common block 25 in the same time zone (S216). Determination whether or not to pass in the same time zone can be calculated by, for example, the movement start time 62, the order of the common block 25 in the travel route 50, and the average speed of the moving body 2. If they do not pass in the same time zone (No in S216), it is determined that there is no possibility that the moving body 2 will collide. For example, with respect to the block "M4" in the example of FIG. 12, which is common between the travel routes 50 of the moving body "A" and the moving body "B" in the fourth block from the start point 45, it is determined that there is no possibility of collision since the movement start time is different. In this case, the travel route generation unit 114 terminates the travel route change process without changing the travel route.

If the passing is in the same time zone (Yes in S216), the travel route generation unit 114 changes the time for passing through the common block 25 (S217). For example, the travel route generation unit 114 changes the travel route so as to wait in the block 25 before the common block 25. In the example of FIG. 12, the travel routes 50 of the moving body "A" and the moving body "C" both have the common block "M7" in the seventh block of the route and have the same movement start time. Therefore, the time during which the moving body "A" passes through the block "M7" is changed. For example, in the travel route 50 of the moving body "A", the block "M6" is further added before the block "M7", thereby causing the moving body "A" to stand by at the block "M6". This avoids the collision between the moving body "A" and the moving body "C".

In the present embodiment, the case where each of a plurality of users owns a pair of the route control device 1 and the moving body 2 has been described as an example, but it is also possible for one or a plurality of users to set travel routes for a plurality of moving bodies 2 by one route control device 1. In this case, the route information 60 indicating the travel route of each of the plurality of moving bodies 2 is stored in the first storage 130 of one route control device 1. Therefore, the travel route generation unit 114 may acquire the route information 60 indicating the travel routes of the plurality of moving bodies 2 from the first storage 130 in step S211.

It may be arbitrarily set that the travel route of which moving body 2 is to be changed when the common block 25 exists. For example, the route information 60 may include the priority order of the moving body 2. In this case, the travel route of the moving body 2 having a low priority order may be changed. Further, the route information 60 may include an allowable final arrival time. In this case, the travel route of the moving body 2 having a large difference between the estimated arrival time calculated from the movement start time 62 and the travel route 50 and the allowable final arrival time may be changed.

As described above, the controller 110 compares the travel routes of the plurality of moving bodies 2 with each other, determines whether or not there is an identical block 25 in the travel routes of the plurality of moving bodies 2, and changes the travel route if there is the identical block 25. This makes it possible to avoid collision between the moving bodies 2.

Third Embodiment

In the first embodiment, the route control device 1 generates the travel route of the moving body 2, but in the third embodiment, the moving body 2 generates a travel route. The route control device 1 and the moving body 2 constitute a route generation device in the present embodiment. Specifically, the route control device 1 sets the no-go zone 30 and the available zone 35. The moving body 2 sets a travel route.

Figure 13:
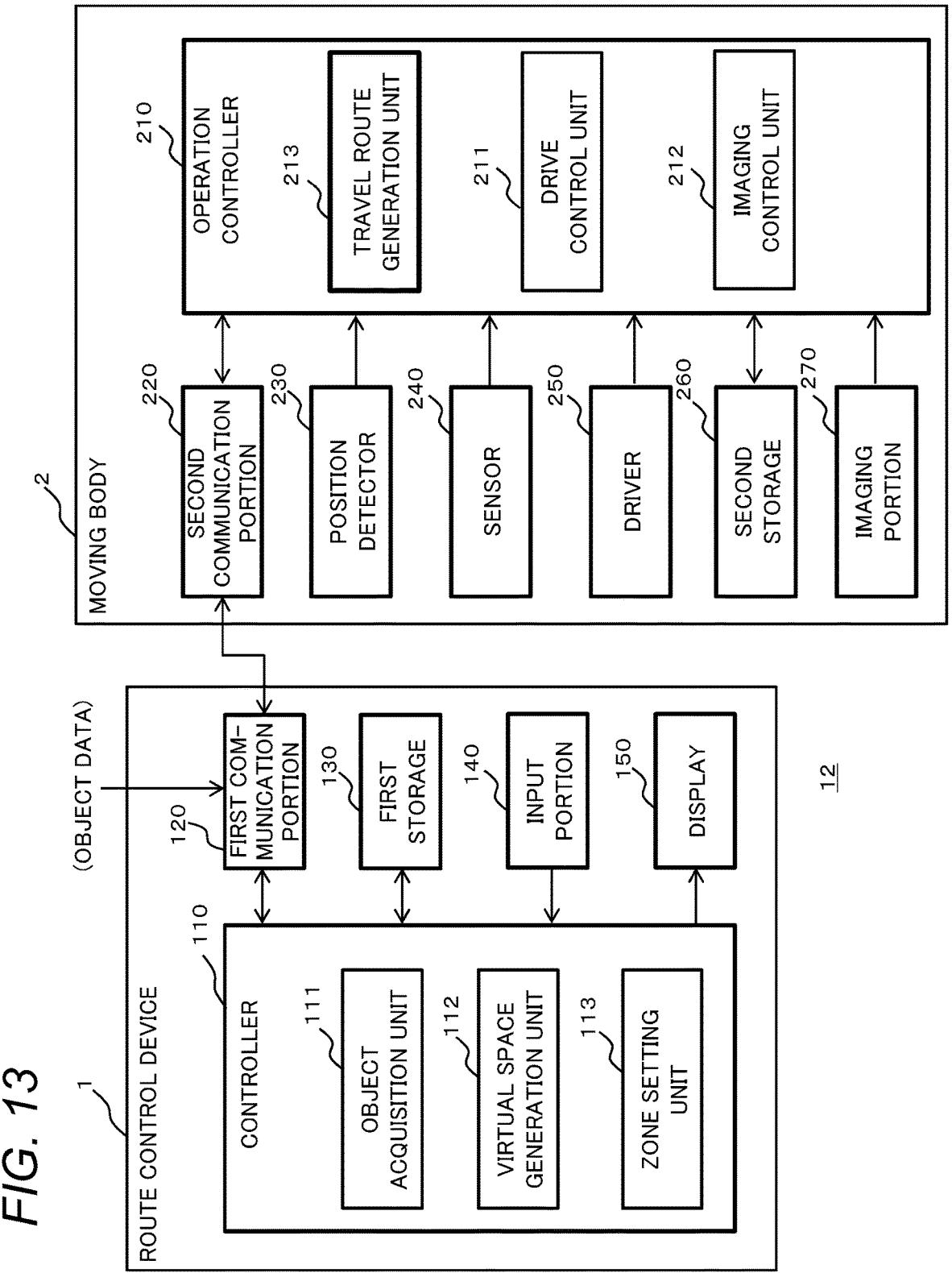
FIG. 13 is a diagram showing a configuration of a route control device and a moving body according to a third embodiment.

FIG. 13 shows configurations of the route control device 1 and the moving body 2 in the third embodiment. In the present embodiment, the operation controller 210 of the moving body 2 includes a travel route generation unit 213. Note that, the route control device 1 does not include the travel route generation unit 114 shown in FIG. 1.

Figure 14:
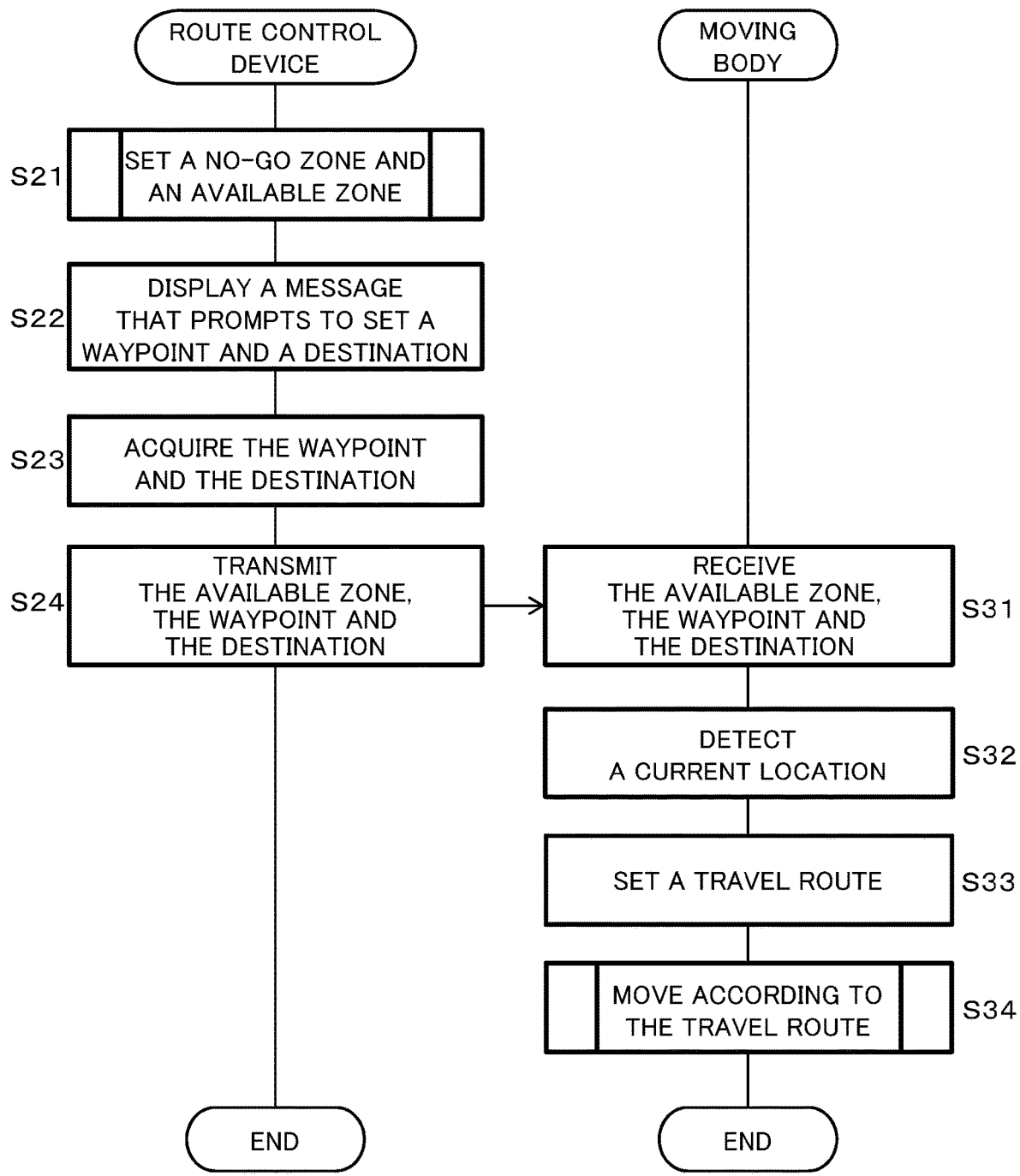
FIG. 14 is a sequence diagram for explaining the overall operation of the route control device and the moving body in the third embodiment.

FIG. 14 shows the overall operation of the route control device 1 and the moving body 2 in the third embodiment. The controller 110 of the route control device 1 sets the no-go zone 30 and the available zone 35 (S21). Step S21 is the same as step S1 in FIG. 2.

The controller 110 displays a message for prompting to set the waypoint and the destination on the display 150 (S22). At this step, the travel route generation unit 213 displays the no-go zone 30 and the available zone 35 on the display 150 in the visually distinguishable manner with each other. For example, they are displayed with different colors. The controller 110 acquires information that identifies the blocks 25 specified by the user as a waypoint and a destination (S23). As shown in FIG. 7 of the first embodiment, information that identifies the destination may be acquired first, and then information that identifies the waypoint may be acquired.

The controller 110 transmits the zone information indicating the available zone 35 and the information indicating the waypoint and the destination to the moving body 2 (S24). Specifically, information that identifies the position of the block 25 in the available zone 35 and information that identifies the positions of the blocks 25 that are the waypoint and the destination are transmitted to the moving body 2. Instead of the available zone 35 or in addition to the available zone 35, the position information of the block 25 in the no-go zone 30 may be transmitted to the moving body 2.

The travel route generation unit 213 of the operation controller 210 of the moving body 2 receives the zone information indicating the available zone 35 and the information indicating the waypoint and the destination from the route control device 1 via the second communication portion 220 (S31).

The travel route generation unit 213 detects the current location of the moving body 2 from the outputs of the position detector 230 and the sensor 240 (S32). The travel route generation unit 213 sets the current location as the start point 45 of the travel route, and sets the shortest route that starts from the start point 45 of the travel route through the waypoint to reach the destination in the available zone 35 as a travel route (S33). The method for setting the travel route may be the same as or different from that in the first embodiment. The end point of the travel route is arbitrary. For example, the end point of the travel route may be the same as the start point 45 of the travel route.

The drive control unit 211 controls the driver 250 according to the set travel route to move the moving body 2 (S34). Step S34 is the same as step S12 in FIG. 2.

Note that, the travel route generation unit 213 of the moving body 2 may perform the travel route change process shown in FIG. 11 after setting the travel route and before starting the movement (between S33 and S34).

As described above, the moving body 2 of the present embodiment can move along the automatically set travel route. In the present embodiment, the virtual space defined corresponding to a predetermined real space including the moving range of the moving body 2 is divided into a plurality of blocks 25 that are a plurality of regions each having a predetermined three-dimensional shape. The plurality of blocks 25 are respectively set in a no-go zone 30 where the moving body 2 cannot pass and an available zone 35 where the moving body 2 can pass. The moving body 2 includes a second communication portion 220, a position detector 230, a driver 250, and an operation controller 210. The second communication portion 220 acquires zone information indicating the available zone 35. The position detector 230 detects the current location of the moving body 2. The driver 250 moves the moving body 2. The operation controller 210 sets a travel route by specifying the blocks 25 in the available zone 35. The operation controller 210 controls the driving unit 250 based on the current location and the travel route.

Since the available zone 35 is set by the block 25, the moving body 2 can set the travel route relatively easily.

Other Embodiments

The moving body 2 is not limited to an unmanned aircraft such as a drone. The moving body 2 may be an unmanned terminal that moves autonomously, and may be, for example, a robot that moves autonomously. The moving body 2 is not limited to a structure that moves unmanned. The moving body 2 only needs to be able to move autonomously according to the set travel route, and may have a structure that moves manned. Further, the moving body 2 may have a structure that does not fly. For example, the moving body 2 may have a structure that moves on the ground, a wall, or a rail.

The object 10 is not limited to an aircraft. The present invention can be applied to any object 10. For example, the object 10 includes an inspection object that is a target of visual inspection using an image captured by the imaging portion 270 of the moving body 2. Further, the object 10 is not limited to the inspection object, and may be a structure in which the user performs capturing an image with the imaging portion 270. Specifically, the object 10 may be a vehicle. Examples of the vehicle include an automobile, a two-wheeler, and a train. Further, since the no-go zone 30 is set by the object 10, the object 10 is not limited to the inspection object. The object 10 may be a structure that prevents movement of the moving body 2. Examples of the structure that becomes the object 10 include a building and a bridge.

The three-dimensional shape that divides the virtual space 20 is not limited to the cubic block 25, and may be another three-dimensional shape. For example, the virtual space 20 may be divided by a rectangular parallelepiped or a triangular pyramid.

In the above embodiment, the user sets the destination and the waypoint, but may set a part or all of the travel route from the start point 45 to the end point. For example, the input portion 140 is a touch panel configured with the display 150. The input portion 140 may have a structure in which adjacent blocks 25 are continuously selected and a travel route is set by a user operating a touch panel.

Data indicating the shape of the object 10 is not limited to CAD data. The data indicating the shape of the object 10 may only indicate the shape of the object 10. For example, the data indicating the shape of the object 10 may be a photograph.

The size of the block 25 may be determined based on the accuracy of position detection by the position detector 230 and the sensor 240 of the moving body 2. For example, the size of the block 25 may be set smaller as the detection accuracy is higher.

The transmission of route information from the route control device 1 to the moving body 2 is not limited to communication using a wireless communication channel by the first communication portion 120 and the second communication portion 220. The transmission of route information from the route control device 1 to the moving body 2 may be performed by a wired communication line. For example, the moving body 2 may receive route information from the route control device 1 in accordance with a communication standard such as HDMI (registered trademark) or USB. Further, transmission/reception of route information may be performed without through the first communication portion 120 and the second communication portion 220. For example, the route control device 1 may store the generated route information in a portable recording medium, and the moving body 2 may read the route information from the recording medium. Similarly, the zone information indicating the available zone 35 and the information indicating the waypoint and the destination may be recorded in the moving body 2 without through the first communication portion 120 and the second communication portion 220.

In the above embodiment, the route control device 1 defines the virtual space 20 and sets the no-go zone 30 and the available zone 35 based on the object 10. However, the moving body 2 may define the virtual space 20 and perform a setting process of the no-go zone 30 and the available zone 35 based on the object 10. That is, the route generation device may be configured by only the moving body 2. In this case, the moving body 2 has the same configuration as the route control device 1 of the first embodiment.

A program executed by the controller to realize the functions of the route control device 1 and the moving body 2 may be provided.

As described above, specific embodiments and modifications of the present invention have been described, but the present invention is not limited to the above-described embodiments and the like, and various modifications may be made within the scope of the present invention. For example, what combined suitably contents of the above-described individual embodiments can be made into one embodiment of the present invention.

INDUSTRIAL APPLICABILITY

The route generation device of the present invention is useful as a device for generating a travel route of a moving body.

REFERENCE SIGNS LIST

1 Route control device
2 Moving body
12 Imaging system
110 Controller
111 Object acquisition unit
112 Virtual space generation unit
113 Zone setting unit
114, 213 Travel route generation unit
120 First communication portion
130 First storage
140 Input portion
150 Display
210 Operation controller
220 Second communication portion
230 Position detector
240 Sensor
250 Driver
260 Second storage
270 Imaging portion
211 Drive control unit
212 Imaging control unit

The invention claimed is:

1. A route generation device for generating a travel route of a moving body, the route generation device comprising:
an acquisition portion configured to acquire object data indicating a shape of an object; and
a controller configured to set the travel route of the moving body based on the object data, wherein
the controller is configured to
define a virtual space corresponding to a predetermined real space including a moving range for the moving body,
divide the virtual space into a plurality of regions, the plurality of divided regions each having a predetermined three-dimensional shape,
place the object in the virtual space by associating a three-dimensional coordinate system of the object with a three-dimensional coordinate system of the virtual space,
set a region out of the plurality of divided regions in the virtual space that overlaps the object among the plurality of divided regions as a no-go zone where the moving body is not allowed to pass, and
set a region out of the plurality of divided regions in the virtual space that does not overlap the object among the plurality of divided regions as an available zone where the moving body is allowed to move,
wherein each of the plurality of divided regions in the virtual space is set to have a size equal to or larger than a size of the moving body and smaller than a size of the object.

2. The route generation device according to claim 1, wherein the controller is configured to set the travel route by specifying the divided region in the available zone.

3. The route generation device according to claim 1, further comprising a display configured to display the no-go zone and the available zone in a visually distinguishable manner with each other.

4. The route generation device according to claim 1, wherein the controller is configured to
compare travel routes of a plurality of moving bodies with each other,
determine whether or not there is an identical divided region in the travel routes of the plurality of moving bodies, and
change the travel route in a case where there is the identical divided region.

5. A moving body that moves along a travel route, the moving body comprising:
a position detector configured to detect a current location of the moving body;
a driver configured to move the moving body; and
a controller configured to control the driver based on the current location and the travel route, wherein
the travel route is set by specifying a divided region in an available zone in a virtual space defined corresponding to a predetermined real space including a moving range for the moving body, the virtual space being divided into a plurality of regions each having a predetermined three-dimensional shape, and having an object placed therein by associating a three-dimensional coordinate system of the object with a three-dimensional coordinate system of the virtual space, each of the plurality of divided regions being set as a no-go zone where the moving body is not allowed to pass or as the available zone where the moving body is allowed to pass,
wherein each of the plurality of divided regions in the virtual space is set to have a size equal to or larger than a size of the moving body and smaller than a size of the object.

6. A non-transitory computer-readable recording medium storing a program for generating a travel route of a moving body, the program causing a computer to execute:
defining a virtual space corresponding to a predetermined real space including a moving range for the moving body;
dividing the virtual space into a plurality of regions, the plurality of divided regions each having a predetermined three-dimensional shape;
placing an object in the virtual space by associating a three-dimensional coordinate system of the object with a three-dimensional coordinate system of the virtual space;
setting a region out of the plurality of divided regions in the virtual space that overlaps the object among the plurality of divided regions as a no-go zone where the moving body is not allowed to move;
setting a region out of the plurality of divided regions in the virtual space that does not overlap the object among the plurality of divided regions as an available zone where the moving body is allowed to move; and
setting the travel route by specifying the divided region in the available zone, wherein each of the plurality of divided regions in the virtual space is set to have a size equal to or larger than a size of the moving body and smaller than a size of the object.

7. The route generation device according to claim 1, wherein the display is configured to display the no-go zone, the available zone and the travel route in a visually distinguishable manner with each other, for each divided region.

8. The route generation device according to claim 7, wherein the visually distinguishable manner of the display is based on at least one of color coded or transparency.

* * * * *